(12) United States Patent
Chen et al.

(10) Patent No.: US 11,915,058 B2
(45) Date of Patent: Feb. 27, 2024

(54) VIDEO PROCESSING METHOD AND DEVICE, ELECTRONIC EQUIPMENT AND STORAGE MEDIUM

(71) Applicant: BOE Technology Group Co., Ltd., Beijing (CN)

(72) Inventors: Wenbin Chen, Beijing (CN); Yan Gao, Beijing (CN); Guannan Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 442 days.

(21) Appl. No.: 17/407,145

(22) Filed: Aug. 19, 2021

(65) Prior Publication Data

US 2022/0100576 A1    Mar. 31, 2022

(30) Foreign Application Priority Data

Sep. 30, 2020  (CN) .......................... 202011059057.0

(51) Int. Cl.
| | |
|---|---|
| G06F 3/00 | (2006.01) |
| G06F 9/48 | (2006.01) |
| G06F 9/50 | (2006.01) |
| H04N 19/124 | (2014.01) |
| H04N 19/176 | (2014.01) |

(52) U.S. Cl.
CPC ............ G06F 9/5066 (2013.01); G06F 9/485 (2013.01); G06F 9/505 (2013.01); H04N 19/124 (2014.11); H04N 19/176 (2014.11)

(58) Field of Classification Search
CPC .................................................. G06F 9/455
See application file for complete search history.

(56) References Cited

U.S. PATENT DOCUMENTS

| | | | | |
|---|---|---|---|---|
| 8,041,852 B1 * | 10/2011 | Mattson | ................... | G06F 13/28 |
| | | | | 718/107 |
| 8,223,845 B1 * | 7/2012 | Duvivier | ................ | H04N 19/86 |
| | | | | 375/240.24 |
| 10,225,607 B1 | 3/2019 | Bai et al. | | |

(Continued)

FOREIGN PATENT DOCUMENTS

| | | |
|---|---|---|
| CN | 104320622 A | 1/2015 |
| CN | 109345490 A | 2/2019 |

(Continued)

OTHER PUBLICATIONS

Young Geun Kim, Enhancing Energy Efficiency of Multimedia Applications in Heterogeneous Mobile Multi-Core Processors. (Year: 2017).*

*Primary Examiner* — Lechi Truong
(74) *Attorney, Agent, or Firm* — IPro, PLLC (57) ABSTRACT

A video processing method and device, electronic equipment and a storage medium, which are applied to the technical field of computers. The method comprises: acquiring video data to be processed; generating video enhancement tasks corresponding to each video frame in the video data to be processed, the video enhancement task comprising a plurality of video enhancement subtasks; and simultaneously executing at least two different video enhancement subtasks of the plurality of video frames in a multi-thread concurrent manner, a single thread correspondingly executing one video enhancement subtask.

11 Claims, 7 Drawing Sheets

---

Dividing the artificial intelligence video enhancement subtask of the video frame into a plurality of block tasks according to a target block size ⟶ 20311

↓

Allocating the plurality of block tasks of at least one video frame to the first data processing chip and the second data processing chip ⟶ 20312

(56) References Cited

U.S. PATENT DOCUMENTS

| | | | | |
|---|---|---|---|---|
| 2009/0083753 A1* | 3/2009 | Tzruya | ................. | G06F 9/4843 |
| | | | | 718/107 |
| 2010/0246665 A1* | 9/2010 | Brederson | ............ | H04N 19/174 |
| | | | | 375/E7.026 |
| 2014/0153635 A1* | 6/2014 | Zhang | ................. | H04N 19/423 |
| | | | | 375/240.02 |
| 2021/0065657 A1* | 3/2021 | Zhang | ....................... | G06T 1/20 |

FOREIGN PATENT DOCUMENTS

| | | |
|---|---|---|
| CN | 110087084 A | 8/2019 |
| CN | 111010493 B | 3/2021 |

\* cited by examiner

VIDEO PROCESSING METHOD AND DEVICE, ELECTRONIC EQUIPMENT AND STORAGE MEDIUM

The disclosure claims the priority of a Chinese patent application filed in the China National Intellectual Property Administration on Sep. 30, 2020 with an application number of 202011059057.0 and a title of "Video Processing Method and Device, Electronic Equipment and Storage Medium", the entire contents of which are hereby incorporated by reference.

TECHNICAL FIELD

The present disclosure belongs to the technical field of computers, and particularly relates to a video processing method and device, electronic equipment and a storage medium.

BACKGROUND

With the development of information technology, users can obtain various kinds of data through their mobile phones, tablets, notebook computers and other electronic equipment, and their demand for higher quality videos is increasing day by day.

Video enhancement methods such as denoising, super resolution and model processing have been described in related arts.

SUMMARY

The present disclosure provides a video processing method and device, electronic equipment and a storage medium.

A first aspect of the present disclosure provides a video processing method applied to electronic equipment, comprising:

acquiring video data to be processed;

generating video enhancement tasks corresponding to each video frame in the video data to be processed, the video enhancement task comprising a plurality of video enhancement subtasks; and simultaneously executing at least two different video enhancement subtasks of the plurality of video frames in a multi-thread concurrent manner, a single thread correspondingly executing one video enhancement subtask.

A second aspect of the present disclosure provides electronic equipment, comprising a memory, a processor, and a computer program stored in the memory and operable on the processor, wherein when the processor executes the computer program, the video processing method described in the first aspect is implemented.

A third aspect of the present disclosure provides a computer readable storage medium, wherein the computer readable storage medium stores a computer program which, when executed by a processor, implements the video processing method described in the first aspect.

A fourth aspect of the present disclosure provides a computer program product, comprising a computer-readable code, when the computer-readable code runs on electronic equipment, the electronic equipment is caused to perform the video processing method described in the first aspect.

The above description is only an overview of the technical solution of the present disclosure, which can be implemented according to the contents of the specification in order to understand the technical means of the present disclosure more clearly, and in order to make the above and other objects, features and advantages of the present disclosure more obvious and understandable, the detailed description of the present disclosure will be given below.

BRIEF DESCRIPTION OF THE DRAWINGS

Various other advantages and benefits of the invention will become apparent to those of ordinary skill in the art upon reading the following detailed description of preferred embodiments. The drawings are only for the purpose of illustrating preferred embodiments, and are not to be considered as limiting the invention. Throughout the drawings, the same components are denoted by the same reference numerals. In the drawings.

DETAILED DESCRIPTION

Exemplary embodiments of the present disclosure will be described in more detail below with reference to the accompanying drawings. Although exemplary embodiments of the present disclosure are shown in the drawings, it should be understood that the present disclosure may be embodied in various forms and should not be limited by the embodiments set forth herein. On the contrary, these embodiments are provided to enable a more thorough understanding of the present disclosure and to fully convey the scope of the present disclosure to those skilled in the art.

Figure 1:
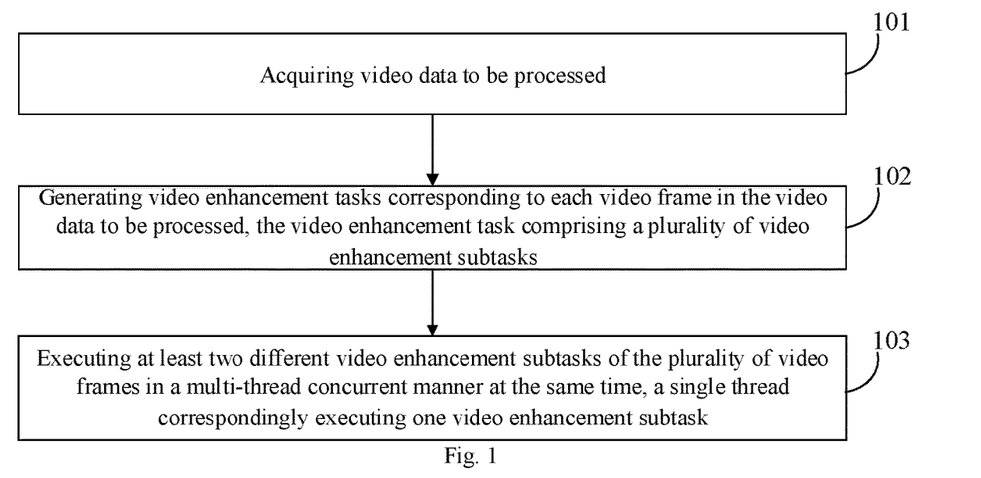
FIG. 1 is a flowchart of a video processing method provided by an embodiment of the present disclosure.

FIG. 1 is a flowchart of a video processing method provided by an embodiment of the present disclosure. The method comprises:

Step 101, acquiring video data to be processed.

In this embodiment of the present disclosure, the video data to be processed refer to the video data that require video enhancement, and the video data can be obtained by a system locally or from a different place, which is determined according to actual requirements, and is not limited here.

To meet the users' demand for high video quality, users can specify the video data to be processed after video production is completed or when a video needs to be played, so as to realize video enhancement.

Step 102, generating video enhancement tasks corresponding to each video frame in the video data to be processed, the video enhancement task comprising a plurality of video enhancement subtasks.

In this embodiment of the present disclosure, the video enhancement task refers to a task that needs to be performed during the video enhancement process of the video data to be processed in order to improve the video quality of the video data to be processed. The video enhancement task can be composed of various video enhancement subtasks. It can be understood that in order to obtain higher quality video data, the video data to be processed can be subjected to video enhancement by various processing methods.

Step 103, simultaneously executing at least two different video enhancement subtasks of the plurality of video frames in a multi-thread concurrent manner, a single thread correspondingly executing one video enhancement subtask.

In this embodiment of the present disclosure, the multi-thread concurrent manner refers to executing multiple video enhancement subtasks of multiple video frames simultaneously through multiple threads for different video enhancement subtasks, and the same video enhancement subtask of different video frames can be executed concurrently by setting multiple threads.

In order to improve the efficiency of video enhancement, multiple threads can be set to execute the video enhancement subtasks of multiple video frames at the same time, and the multiple threads can be set according to the execution order of the video enhancement subtasks; each video frame can only execute one video enhancement subtask on one thread at one time, and after a video frame executes one video enhancement subtask on one thread, a next thread will execute a next video enhancement subtask, and the previous thread will continue to execute the previous video enhancement subtask of another video frame, so that the multiple threads can perform video enhancement on each video frame in the video data in a pipelining manner. Compared with the related art where the video enhancement process of one video frame is executed only after all the video enhancement processes of a previous video frame are executed, the method has the advantages that the utilization of data processing resources is more sufficient and the idle time of data processing resources is shorter. This method is especially suitable for electronic equipment with poor data processing capability, such as mobile terminals, personal computers and notebook computers, and can effectively improve the utilization rate of data processing resources and the efficiency of video enhancement.

According to the video processing method provided by the present disclosure, the video data are processed in a multi-thread concurrent manner, and multiple video frames can be simultaneously processed in different video enhancement modes, which improves the utilization rate of data processing resources, thus improving the efficiency of video enhancement, and enabling users to obtain higher quality videos through electronic equipment with poor data processing capability.

Figure 2:
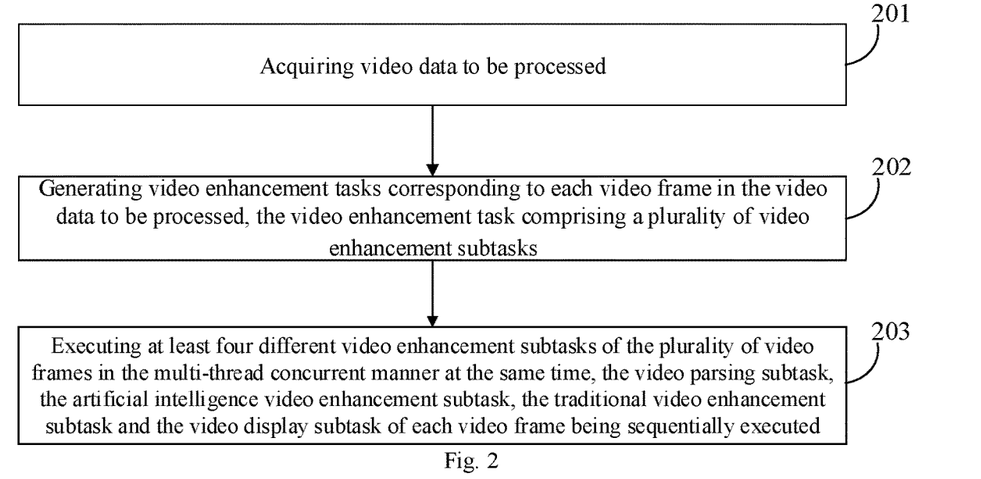
FIG. 2 is a flowchart of a video enhancement task allocation method provided by an embodiment of the present disclosure.

FIG. 2 is a flowchart of another video processing method provided by an embodiment of the present disclosure. The method comprises:

Step 201, acquiring video data to be processed.

This step can be implemented by referring to the detailed description of step 101, which will not be repeated here.

Step 202, generating video enhancement tasks corresponding to each video frame in the video data to be processed, the video enhancement task comprising a plurality of video enhancement subtasks.

This step can be implemented by referring to the detailed description of step 102, which will not be repeated here.

Optionally, the video enhancement subtasks include a video parsing subtask, an artificial intelligence video enhancement subtask, a traditional video enhancement subtask and a video display subtask.

Step 203, simultaneously executing at least four different video enhancement subtasks of the plurality of video frames in the multi-thread concurrent manner, the video parsing subtask, the artificial intelligence video enhancement subtask, the traditional video enhancement subtask and the video display subtask of each video frame being sequentially executed.

In this embodiment of the present disclosure, the video parsing subtask refers to obtaining a time stamp of the video data and source data of key frames by parsing the video data to be processed, so that the video data to be processed can be split into video frames to prepare for the subsequent video enhancement process. Of course, the parsing process can also include format conversion and other processes, which can be determined according to actual needs, and is not limited here.

The artificial intelligence video enhancement subtask refers to a task for video enhancement of the video data to be processed by means of a deep learning model, which can be any model with a video enhancement function in the related art, and the specific type of the deep learning model can be determined according to actual needs and is not limited here.

The traditional video enhancement subtask refers to video enhancement ways in the related art other than using the deep learning model, such as denoising, chroma optimization, etc., which can be determined according to actual needs, and is not limited here.

The video display subtask refers to outputting the video data after video enhancement through electronic equipment, so as to display the video data after video enhancement.

In practical present disclosures, at least four threads can be set to execute the above-mentioned video enhancement subtasks respectively, and the four threads can simultaneously execute the four video enhancement subtasks of four video frames. Specifically, because of the execution sequence of the above-mentioned video enhancement subtasks, a single video frame can only execute one video enhancement subtask at one time, and the next video enhancement subtask can only be executed after the last one is executed. Therefore, a single video frame can only perform one video enhancement subtask on one thread at one time point, while other threads can perform other video enhancement subtasks of other video frames. For example, there are four threads A, B, C, D which are respectively used to perform the above four video enhancement subtasks, and four video frames 1, 2, 3, 4, at one time point, the video frame 4 has completed the video enhancement subtasks for which the threads A, B, C are responsible, which means that the video display subtask for which the thread D is responsible is being executed, and so on; and the thread C is executing the traditional video enhancement subtask of the video frame 3, the thread B is executing the artificial intelligence video enhancement subtask of the video frame 2, and the thread A is executing the video parsing subtask of the video frame 1.

Optionally, the electronic equipment comprises first data processing chips and second data processing chips. The step 203 may comprise:

Sub-step 2031, when executing the artificial intelligence video enhancement subtask, allocating the artificial intelligence video enhancement subtask of at least one video frame to the first data processing chip and the second data processing chip to run threads of the artificial intelligence video enhancement subtask on the first data processing chip and the second data processing chip.

In this embodiment of the present disclosure, the first data processing chip and the second data processing chip refer to a data processing chip like a central processing unit (CPU), a graphics processing unit (GPU) or an embedded neural-network processing unit (NPU) in data processing equipment. The first data processing chip and the second data processing chip can be data processing chips arranged on the same data processing equipment, or data processing chips arranged on different data processing equipment, which can be determined according to actual requirements and is not limited here.

In practical present disclosures, for data processing chips such as CPU, in order to improve the data processing capability, there are usually a plurality of data processing chips for processing different types of data, such as GPU and NPU or other types of data processing chips. For this kind of data processing equipment, the artificial intelligence video enhancement subtask of the video frame can be assigned to the first data processing chips and the second data processing chips for processing. Although different data processing chips have different processing capabilities, this method can make full use of the processing resources of data processing equipment, thus improving the utilization rate of data processing resources, and improving the efficiency of video enhancement accordingly.

Figure 3:
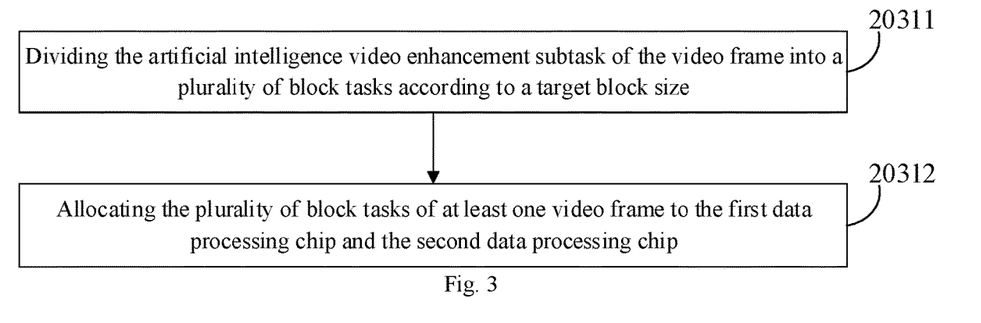
FIG. 3 is a flowchart of a task partitioning method provided by an embodiment of the present disclosure.

Optionally, referring to FIG. 3, sub-step 2031 comprises:

Sub-step 20311, dividing the artificial intelligence video enhancement subtask of the video frame into a plurality of block tasks according to a target block size.

In this embodiment of the present disclosure, the target block size refers to a size of each block obtained after dividing the video data to be processed, which can be set manually or measured based on experiments. A branch task refers to the artificial intelligence video enhancement subtask of some of the video frames.

In order to improve the execution efficiency of the artificial intelligence video enhancement task of the video frame, the artificial intelligence video enhancement subtask of a single video frame can be divided into multiple block tasks according to the target block size.

Sub-step 20312, allocating the plurality of block tasks of at least one video frame to the first data processing chip and the second data processing chip.

In this embodiment of the present disclosure, because the data processing resources required by the artificial intelligence video enhancement subtask are positively related to a size of the video frame, after being partitioned according to the target block size, the artificial intelligence video enhancement subtask of the video frame is allocated to the first data processing chips and the second data processing chips for cooperative execution of the artificial intelligence video enhancement subtask of the same video frame.

Figure 4:
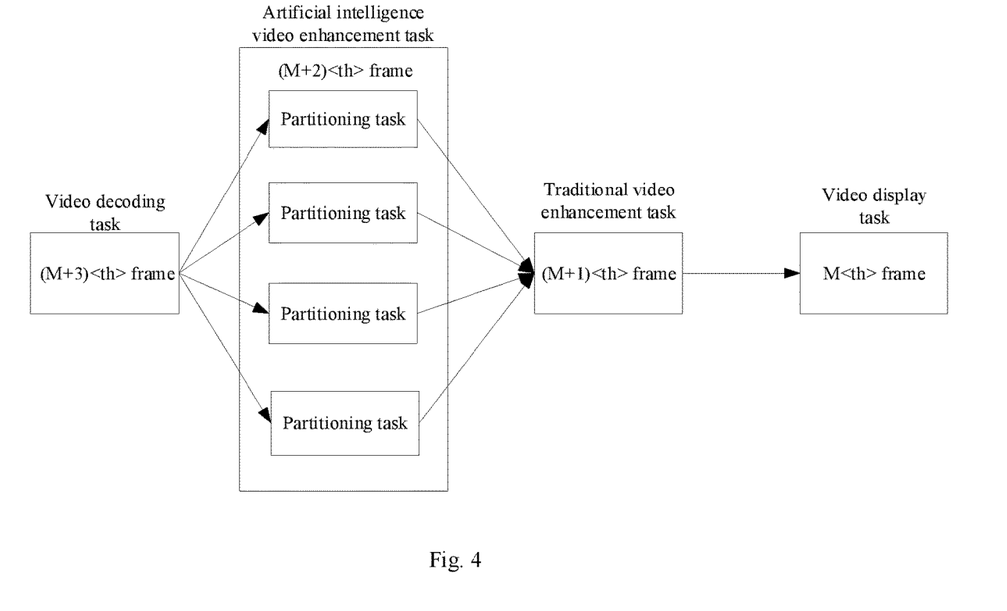
FIG. 4 is an effect diagram of a video processing method provided by an embodiment of the present disclosure.

By way of example, referring to FIG. 4 which is an effect diagram of a video processing method provided by an embodiment of the present disclosure, there are four threads respectively used for executing the video parsing subtask, the artificial intelligence video enhancement subtask, the traditional video enhancement subtask and the video display subtask.

When the first thread executes the video parsing subtask of an (M+3)<th> frame, the second thread can execute the artificial intelligence video enhancement subtask of an (M+2)<th> frame which is divided into four block tasks to be processed by four data processing chips, the third thread can execute the traditional video enhancement subtask of an (M+1)<th> frame, and the fourth thread can execute the video display subtask of an (M)<th> frame.

Because the data processing capability of a data processing chip in data processing equipment with poor data processing capability is limited, it will take a long time to execute an artificial intelligence video enhancement subtask of a whole video frame by one data processing chip, which makes the whole process of video enhancement time-consuming. Therefore, by dividing the artificial intelligence video enhancement subtask of a single video frame into the plurality of block tasks according to sizes to be simultaneously executed by the plurality of data processing chips, this embodiment of the present disclosure can effectively shorten the time required for executing the artificial intelligence video enhancement subtask of a single video frame, thereby improving the overall execution efficiency of video enhancement and realizing the real-time output of video enhancement.

Figure 5:
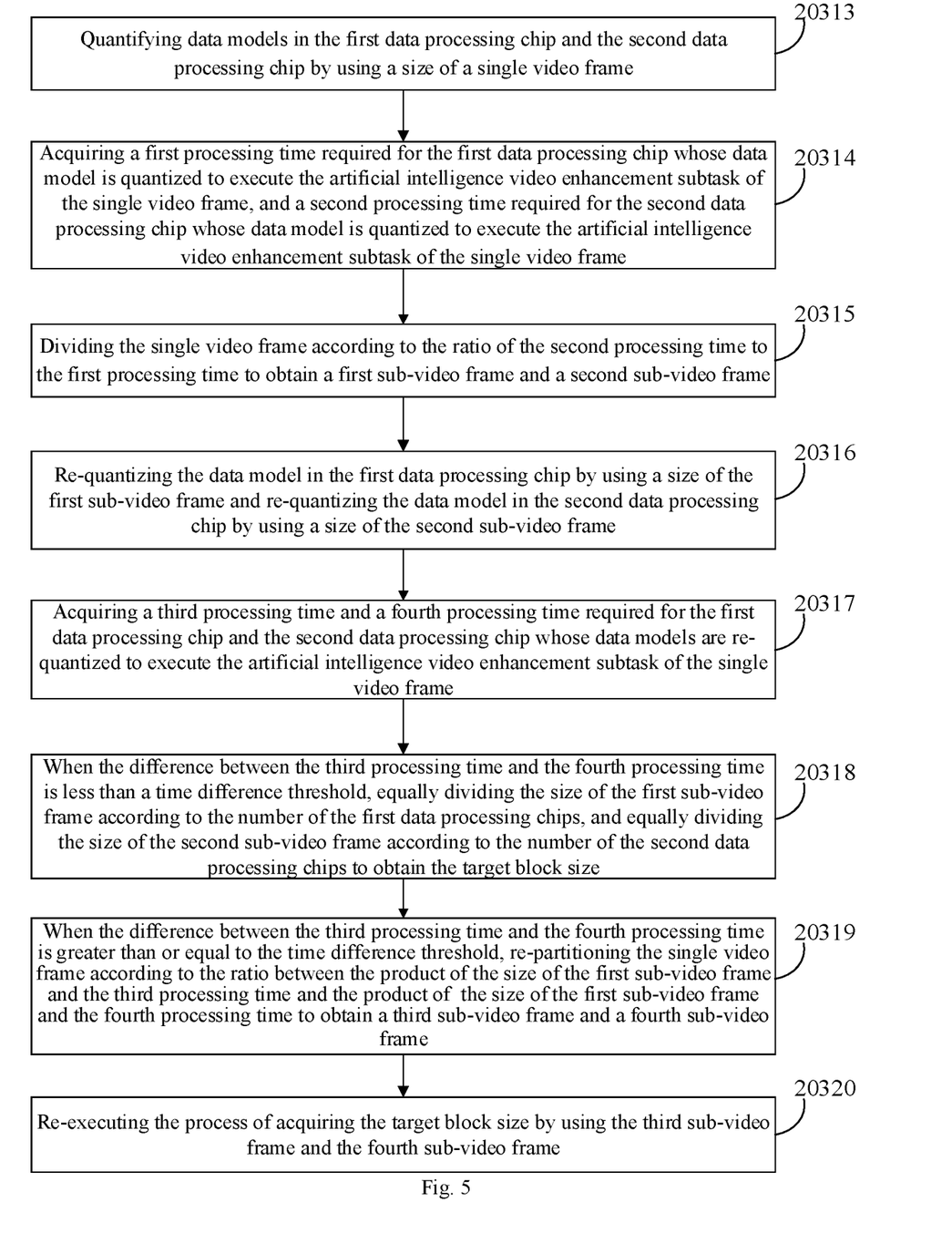
FIG. 5 is a flowchart of a method for determining a block size provided by an embodiment of the present disclosure.

Optionally, referring to FIG. 5, before step 20311, the method further comprises:

Sub-step 20313, quantifying data models in the first data processing chip and the second data processing chip by using a size of a single video frame.

In this embodiment of the present disclosure, the data model refers to a model for data processing in the data processing chip. Usually, before processing a video frame, the data model in the data processing chip needs to be quantized according to a size of the video frame, so that the data model of the data processing chip can be applied to the video frame.

Sub-step 20314, acquiring a first processing time required by the first data processing chip whose data model is quantized to execute the artificial intelligence video enhancement subtask of the single video frame, and a second processing time required by the second data processing chip whose data model is quantized to execute the artificial intelligence video enhancement subtask of the single video frame.

In this embodiment of the present disclosure, after quantifying the data processing models of the two video processing chips by using a full-size single video frame, the first processing time and the second processing time for each data processing chip to process the artificial intelligence video enhancement subtask of a single video frame can be obtained.

Sub-step 20315, dividing the single video frame according to the ratio of the second processing time to the first processing time to obtain a first sub-video frame and a second sub-video frame.

In this embodiment of the present disclosure, due to the different data processing capabilities of different data processing chips, in order to ensure a small time difference between the data processing chips for completing the block tasks of the same video frame, the target block size based on which the artificial intelligence video enhancement subtask of the video frame is partitioned needs to be determined according to the data processing capabilities of different data processing chips.

Because the first processing time and the second processing time are the time required by the first data processing chip and the second data processing chip for processing the artificial intelligence video enhancement subtask of the video frames with the same size, the shorter the time used, the stronger the data processing capability, and vice versa. In order to ensure that the two video processing chips can output the block tasks of the same video frame at the same time, and because the processing time is negatively related to the size of the video frame in the block task, the video frame can be divided into the first sub-video frame and the second sub-video frame according to the ratio of the second processing time to the first processing time.

Sub-step 20316, re-quantizing the data model in the first data processing chip by using a size of the first sub-video frame and re-quantizing the data model in the second data processing chip by using a size of the second sub-video frame.

Sub-step 20317, acquiring a third processing time and a fourth processing time required for the first data processing chip and the second data processing chip whose data models are re-quantized to execute the artificial intelligence video enhancement subtask of the single video frame.

In this embodiment of the present disclosure, in order to verify whether the first sub-video frame and the second sub-video frame obtained after division meet the time difference requirement, the data models of the first data processing chip and the second data processing chip are re-quantized according to the sizes of the first sub-video frame and the second sub-video frame, and then the third processing time and the fourth processing time required by the two data processing chips whose data models are re-quantized for processing a single video frame are acquired.

Sub-step 20318, when the difference between the third processing time and the fourth processing time is less than a time difference threshold, equally dividing the size of the first sub-video frame according to the number of the first data processing chips, and equally dividing the size of the second sub-video frame according to the number of the second data processing chips to obtain the target block size.

In this embodiment of the present disclosure, the time difference threshold refers to a maximum time difference allowed by the first processing time and the second processing time. If the time difference between the third processing time and the fourth processing time is less than the time difference threshold, it indicates that the processing of the block tasks of a single video frame by the two data processing chips under the current sizes of the first sub-video frame and the second sub-video frame meets the time difference requirement, so the sizes of the first sub-video frame and the second sub-video frame can be taken as the target block sizes for subsequent partitioning.

Sub-step 20319, under the condition that the difference between the third processing time and the fourth processing time is greater than or equal to the time difference threshold, re-partitioning the single video frame according to the ratio between the product of the size of the first sub-video frame and the third processing time and the product of the size of the first sub-video frame and the fourth processing time to obtain a third sub-video frame and a fourth sub-video frame.

In this embodiment of the present disclosure, if the difference between the third processing time and the fourth processing time is greater than or equal to the time difference threshold, the video frame needs to be re-partitioned. Specifically, the following formula (1) can be used for partitioning:

$$w3/w4=(w1*t3)/(w2*t4) \tag{1}$$

where w3 is a size of the third sub-video frame, w4 is a size of the fourth sub-video frame, t3 is the third processing time, and t4 is the fourth processing time.

Sub-step 20320, re-executing the process of acquiring the target block size by using the third sub-video frame and the fourth sub-video frame.

In this embodiment of the present disclosure, the third sub-video frame is taken as the first sub-video frame, the fourth sub-video frame is taken as the second sub-video frame, and sub-step 20316 is repeated.

According to this embodiment of the present disclosure, the target block size for dividing the artificial intelligence video enhancement subtask is determined according to the time for processing the video frame by the two data processing chips, so that the time difference between different data processing chips on the block tasks of the same video frame is avoided to a certain extent, the waiting time of the data processing chips is reduced as much as possible, and the utilization rate of data processing resources is improved.

Figure 6:
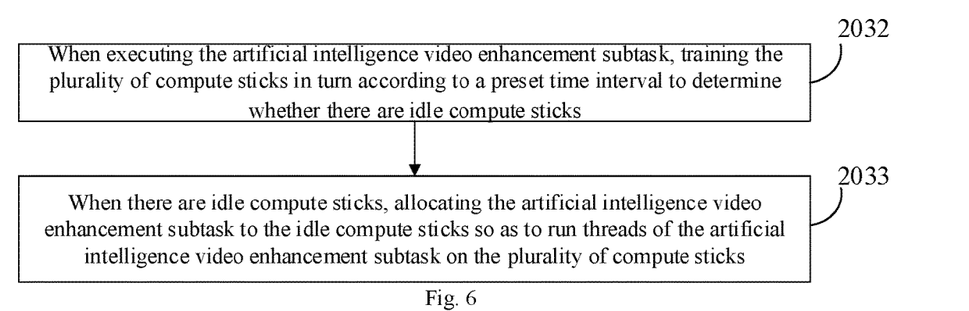
FIG. 6 is a flowchart of another video enhancement task allocation method provided by an embodiment of the present disclosure.

Optionally, the electronic equipment comprises: a mainboard provided with a plurality of compute sticks for running a second thread. Referring to FIG. 6, step 203 may comprise:

Sub-step 2032, when executing the artificial intelligence video enhancement subtask, training the plurality of compute sticks in turn according to a preset time interval to determine whether there are idle compute sticks.

In this embodiment of the present disclosure, the mainboard is a circuit board with a data processing framework, and the compute stick is data processing equipment with data processing capability. By arranging the compute sticks on the mainboard, the data processing capability of the electronic equipment connected to the mainboard can be expanded. The preset time interval refers to a time interval between two training processes.

In practical present disclosure, after the video frame is decoded, whether there are idle compute sticks among the plurality of compute sticks is checked by training the compute sticks in turn, and if there is no idle compute stick, the artificial intelligence video enhancement subtask of the video frame is suspended.

Sub-step 2033, under the condition that there are idle compute sticks, allocating the artificial intelligence video enhancement subtask to the idle compute sticks so as to run threads of the artificial intelligence video enhancement subtask on the plurality of compute sticks.

In this embodiment of the present disclosure, after the artificial intelligence video enhancement subtask of the video frame is suspended, training of the plurality of compute sticks is continued after the preset time interval, and if an idle compute stick is found, the artificial intelligence video enhancement subtask is allocated to the idle compute stick.

Figure 7:
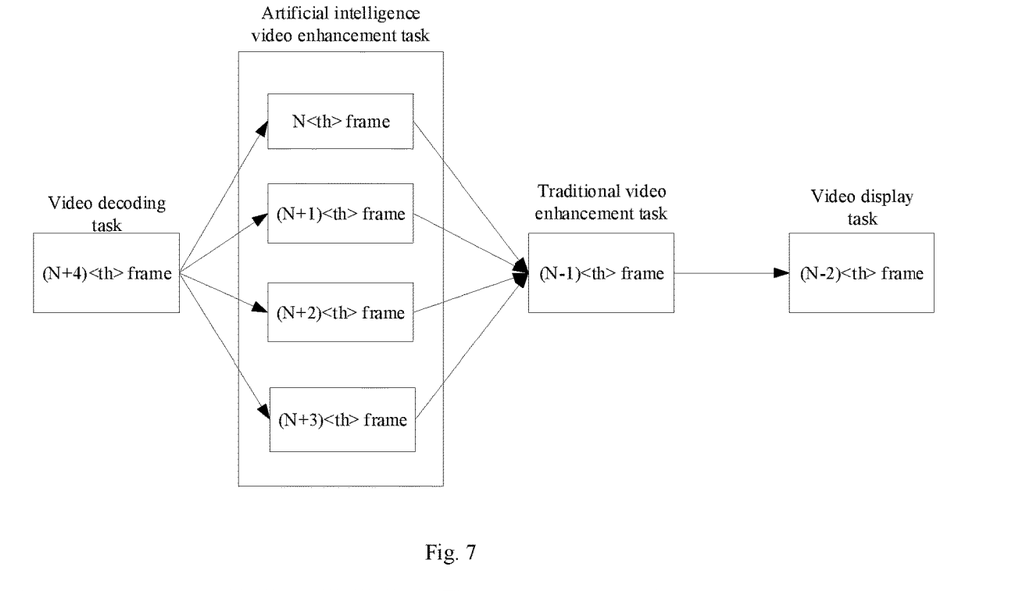
FIG. 7 is an effect diagram of another video processing method provided by an embodiment of the present disclosure.

By way of example, referring to FIG. 7 which is an effect diagram of another video processing method provided by an embodiment of the present disclosure, when the first thread executes the video parsing subtask of an (N+4)<th> frame, the second thread can execute the artificial intelligence video enhancement subtasks of an (N+3)<th> frame, an (N+2)

<th> frame and an (N+1)<th> frame, the third thread can execute the traditional video enhancement subtask of an N<th> frame, and the fourth thread can execute the video display subtask of an (N−1)<th> frame.

In this way, a plurality of compute sticks can simultaneously execute the artificial intelligence video enhancement subtasks of multiple video frames, and compared with the related art in which the video enhancement task of a video frame is performed only after all the video enhancement tasks of a whole previous video frame are executed, the utilization rate of data processing resources is effectively improved, and the efficiency of video enhancement is correspondingly improved.

Figure 8:
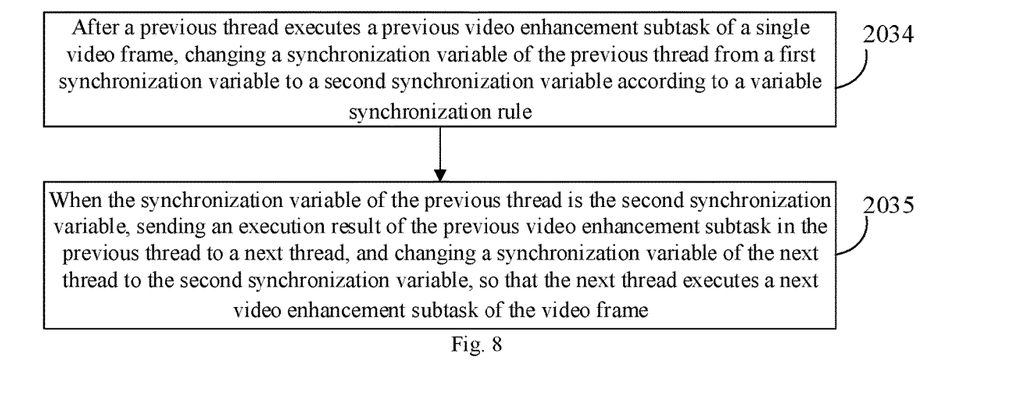
FIG. 8 is a flowchart of yet another video enhancement task allocation method provided by an embodiment of the present disclosure.

Optionally, referring to FIG. 8, step 103 may comprise:

Sub-step 2034, when a previous thread executes a previous video enhancement subtask of a single video frame, changing a synchronization variable of the previous thread from a first synchronization variable to a second synchronization variable according to a variable synchronization rule.

In this embodiment of the present disclosure, the variable synchronization rule refers to a change rule of synchronization variables for each thread. Because the video enhancement subtasks for which multiple threads are responsible have an execution order, time synchronization among different threads needs to be ensured, so that the video enhancement subtasks for which multiple threads are responsible can be executed in an orderly manner. According to this embodiment of the present disclosure, the synchronization variables are introduced to enable synchronization among threads.

Sub-step 2035, when the synchronization variable of the previous thread is the second synchronization variable, sending an execution result of the previous video enhancement subtask in the previous thread to a next thread, and changing a synchronization variable of the next thread to the second synchronization variable, so that the next thread executes a next video enhancement subtask of the video frame.

Figure 9:
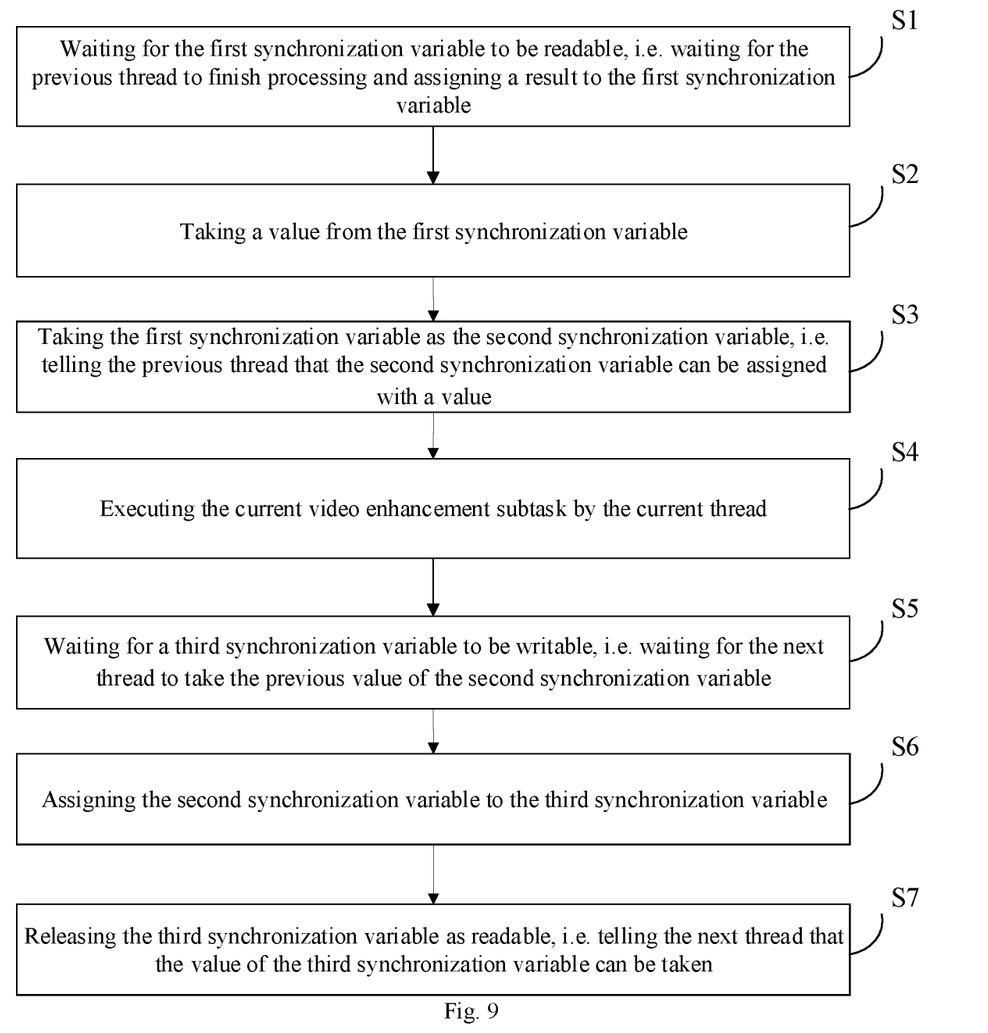
FIG. 9 is a flowchart of a variable synchronization method provided by an embodiment of the present disclosure.

Referring to FIG. 9, synchronization among threads can be realized according to the synchronization variables through the following steps S1 to S7:

S1, waiting for the first synchronization variable to be readable, i.e. waiting for the previous thread to finish processing and assigning a result to the first synchronization variable;

S2, taking a value from the first synchronization variable;

S3, taking the first synchronization variable as the second synchronization variable, i.e. telling the previous thread that the second synchronization variable can be assigned with a value;

S4, executing the current video enhancement subtask by the current thread;

S5, waiting for a third synchronization variable to be writable, i.e. waiting for the next thread to take the previous value of the second synchronization variable;

S6, assigning the second synchronization variable to the third synchronization variable; and S7, releasing the third synchronization variable as readable, i.e. telling the next thread that the value of the third synchronization variable can be taken.

It can be seen that in this embodiment of the present disclosure, the threads know when to acquire the execution results from the previous threads to execute the video enhancement subtasks, and the video enhancement subtasks of multiple video frames can be executed in order.

Figure 10:
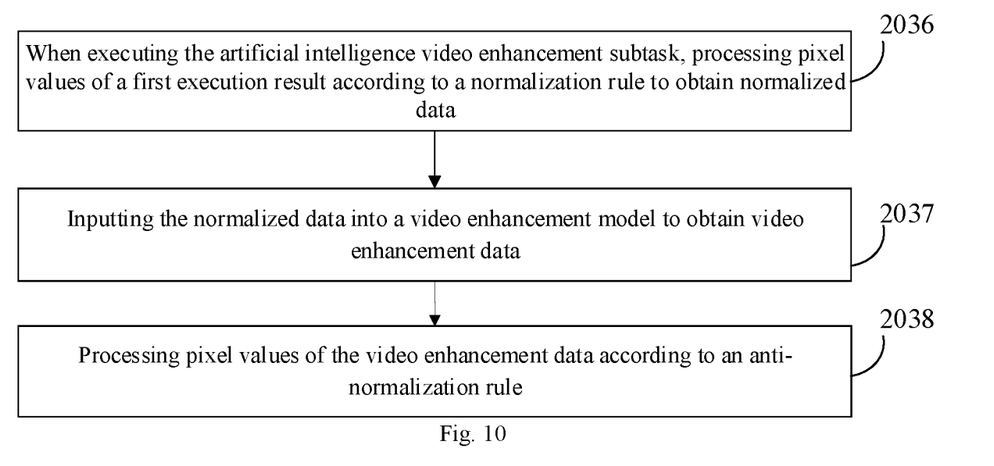
FIG. 10 is a flowchart of still another video enhancement task allocation method provided by an embodiment of the present disclosure.

Optionally, the multiple threads are executed in sequence. Referring to FIG. 10, step 103 may comprise:

Sub-step 2036, when executing the artificial intelligence video enhancement subtask, processing pixel values of a first execution result according to a normalization rule to obtain normalized data.

In this embodiment of the present disclosure, the normalization rule refers to mapping the pixel values of input video data in the RGB (Red Green Blue) format from 0-255 to 0-1 to obtain the normalized data.

Sub-step 2037, inputting the normalized data into a video enhancement model to obtain video enhancement data.

In this embodiment of the present disclosure, the normalized data can be processed by the thread responsible for the artificial intelligence video enhancement subtask through the video enhancement model.

Sub-step 2038, processing pixel values of the video enhancement data according to an anti-normalization rule.

In this embodiment of the present disclosure, the anti-normalization rule refers to mapping the video enhancement data in the real number form output by the video enhancement model to 0-255, that is, if each real number output is 3, then the corresponding pixel value p is 255*e, if p is greater than 255, p is equal to 255, and if p is less than 0, p is equal to 0.

Of course, the above steps 2036 to 2038 can be executed concurrently through multiple threads, so as to improve the data processing efficiency.

Optionally, the multiple threads are executed in sequence. Step 103 may comprise: when executing a traditional video enhancement subtask, performing video enhancement on a second processing result in at least one of the following ways: smoothness enhancement, authenticity enhancement, detail enhancement, contrast and brightness enhancement and size adjustment.

In this embodiment of the present disclosure, smoothness enhancement is to process over-sharpened images in the video data by the Gaussian Blur technology, so that the image effect is smoother;

authenticity enhancement is to add a processing result to an original image in proportion, so that an image in the video data obtained after adding is closer to the actual image quality;

detail enhancement is to obtain the high frequency information of the image by subtracting the Gaussian blurred video image from the original video image, then multiply the high frequency information by a high frequency coefficient, and finally adding the original video image to enhance the details of the video image;

contrast and brightness enhancement is to enhance the contrast and brightness of the video image by normalizing the pixel value of the video image to 0-1, and then processing by the following formula (2):

$$p2 = p1 \hat{} contrast + bright \quad (2)$$

where p2 refers to the pixel value of the processed video image, p1 refers to the pixel value of the original video image, contrast refers to a contrast coefficient, and bright refers to a brightness coefficient; and size adjustment is to pull up the video image according to output requirements, such as pulling up to 720p or converting the video format.

Of course, the above-mentioned traditional video enhancement subtasks can also be executed in a multi-thread concurrent manner to improve the efficiency of data processing.

This embodiment of the present disclosure further improves the video quality after video enhancement through the traditional video enhancement subtask after the artificial intelligence video enhancement subtask.

According to the another video processing method provided by the present disclosure, the video data are processed in a multi-thread concurrent manner, and multiple video frames can be simultaneously processed in different video enhancement modes, which improves the utilization rate of data processing resources, thus improving the efficiency of video enhancement, and enabling users to obtain higher quality videos through electronic equipment with poor data processing capability. In addition, processing resource allocation is conducted on the artificial intelligence video enhancement subtask through training or partitioning, which further improves the utilization rate of data processing resources and improves the efficiency of video enhancement.

Figure 11:
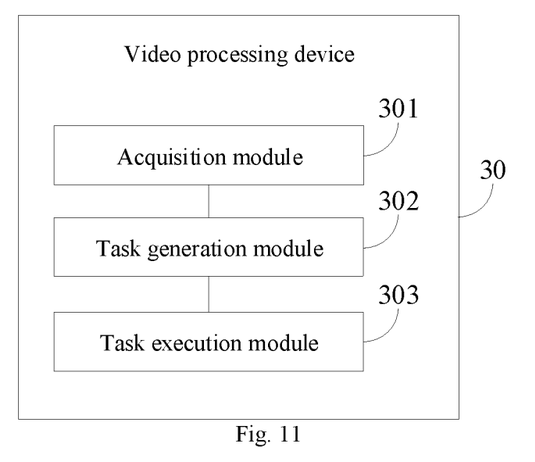
FIG. 11 is a structural block diagram of a video processing device provided by an embodiment of the present disclosure.

FIG. 11 is a structural block diagram of a video processing device provided by an embodiment of the present disclosure. The device comprises:
- an acquisition module 301 configured to acquire video data to be processed;
- a task generation module 302 configured to generate video enhancement tasks corresponding to each video frame in the video data to be processed, the video enhancement task comprising a plurality of video enhancement subtasks; and
- a task execution module 303 configured to simultaneously executing at least two different video enhancement subtasks of the plurality of video frames in a multi-thread concurrent manner, a single thread correspondingly executing one video enhancement subtask.

Optionally, the video enhancement subtasks include a video parsing subtask, an artificial intelligence video enhancement subtask, a traditional video enhancement subtask and a video display.

The task execution module 303 is further configured to:
simultaneously executing at least four different video enhancement subtasks of the plurality of video frames in the multi-thread concurrent manner, the video parsing subtask, the artificial intelligence video enhancement subtask, the traditional video enhancement subtask and the video display subtask of each video frame being sequentially executed.

Optionally, the electronic equipment comprises first data processing chips and second data processing chips.

The task execution module 303 is further configured to:
when executing the artificial intelligence video enhancement subtask, allocating the artificial intelligence video enhancement subtask of at least one video frame to the first data processing chip and the second data processing chip to run threads of the artificial intelligence video enhancement subtask on the first data processing chip and the second data processing chip.

The task execution module 303 is further configured to:
dividing the artificial intelligence video enhancement subtask of the video frame into a plurality of block tasks according to a target block size; and
allocating the plurality of block tasks of at least one video frame to the first data processing chip and the second data processing chip.

The task execution module 303 is further configured to:
quantifying data models in the first data processing chip and the second data processing chip by using a size of a single video frame;
acquiring a first processing time required by the first data processing chip whose data model is quantized to execute the artificial intelligence video enhancement subtask of the single video frame, and a second processing time required by the second data processing chip whose data model is quantized to execute the artificial intelligence video enhancement subtask of the single video frame;
dividing the single video frame according to the ratio of the second processing time to the first processing time to obtain a first sub-video frame and a second sub-video frame;
re-quantizing the data model in the first data processing chip by using a size of the first sub-video frame and re-quantizing the data model in the second data processing chip by using a size of the second sub-video frame;
acquiring a third processing time and a fourth processing time required by the first data processing chip and the second data processing chip whose data models are re-quantized to execute the artificial intelligence video enhancement subtask of the single video frame; and
when the difference between the third processing time and the fourth processing time is less than a time difference threshold, equally dividing the size of the first sub-video frame according to the number of the first data processing chips, and equally dividing the size of the second sub-video frame according to the number of the second data processing chips to obtain the target block size.

The task execution module 303 is further configured to:
when the difference between the third processing time and the fourth processing time is greater than or equal to the time difference threshold, re-partitioning the single video frame according to the ratio between the product of the size of the first sub-video frame and the third processing time and the product of the size of the first sub-video frame and the fourth processing time to obtain a third sub-video frame and a fourth sub-video frame; and
re-executing the process of acquiring the target block size by using the third sub-video frame and the fourth sub-video frame.

Optionally, the electronic equipment comprises: a mainboard provided with a plurality of compute sticks for running a second thread.

The task execution module 303 is further configured to:
when executing the artificial intelligence video enhancement subtask, training the plurality of compute sticks in turn according to a preset time interval to determine whether there are idle compute sticks; and
when there are idle compute sticks, allocating the artificial intelligence video enhancement subtask to the idle compute sticks so as to run threads of the artificial intelligence video enhancement subtask on the plurality of compute sticks.

Optionally, the multiple threads are executed in sequence.

The task execution module 303 is further configured to:
when a previous thread executes a previous video enhancement subtask of a single video frame, changing a synchronization variable of the previous thread from a first synchronization variable to a second synchronization variable according to a variable synchronization rule; and
when the synchronization variable of the previous thread is the second synchronization variable, sending an execution result of the previous video enhancement subtask in the previous thread to a next thread, and changing a synchronization variable of the next thread to the second synchronization variable, so that the next thread executes a next video enhancement subtask of the video frame.

The task execution module 303 is further configured to: when executing the artificial intelligence video enhancement subtask, processing pixel values of a first execution result according to a normalization rule to obtain normalized data;

inputting the normalized data into a video enhancement model to obtain video enhancement data; and processing pixel values of the video enhancement data according to an anti-normalization rule.

The task execution module 303 is further configured to: when executing a traditional video enhancement subtask, performing video enhancement on a second processing result in at least one of the following ways: smoothness enhancement, authenticity enhancement, detail enhancement, contrast and brightness enhancement and size adjustment.

According to the video processing device provided by the present disclosure, the video data are processed in a multi-thread concurrent manner, and multiple video frames can be simultaneously processed in different video enhancement modes, which improves the utilization rate of data processing resources, thus improving the efficiency of video enhancement, and enabling users to obtain higher quality videos through electronic equipment with poor data processing capability.

As the above system embodiments are basically similar to the method embodiments, the description is relatively simple, and please refer to the description of the method embodiments for relevant information.

Figure 12:
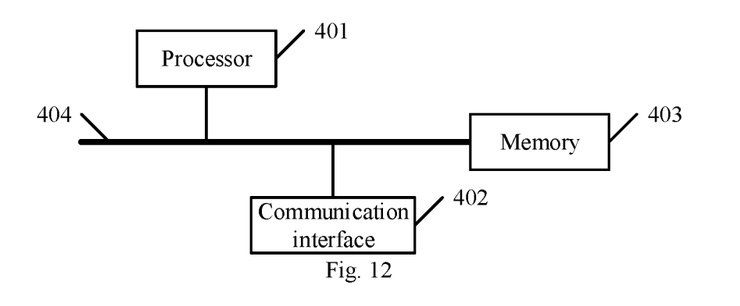
FIG. 12 is a structural block diagram of electronic equipment provided by an embodiment of the present disclosure.

An embodiment of the present disclosure also provides electronic equipment, as shown in FIG. 12, which comprises a processor 401, a communication interface 402, a memory 403 and a communication bus 404, wherein the processor 401, the communication interface 402 and the memory 403 communicate with each other through the communication bus 404;

the memory 403 is configured to store a computer program; and the processor 401 is configured to implement the video processing method shown in FIGS. 1 to 10 when executing the program stored in the memory 403.

The communication bus mentioned in the above terminal may be peripheral component interconnect (PCI) bus or extended industry standard architecture (EISA) bus, etc. The communication bus can be divided into address bus, data bus, control bus, etc. For convenience of illustration, it is represented by one thick line only in the drawings, but it does not mean that there is only one bus or one type of buses.

The communication interface is configured for communication between the terminal and other equipment.

The memory may be a random access memory (RAM) or a non-volatile memory, such as at least one disk memory. Optionally, the memory may also be at least one storage device away from the aforementioned processor.

The above-mentioned processor may be a general-purpose processor, including a central processing unit (CPU), a network processor (NP), etc. It can also be a digital signal processor (DSP), an present disclosure specific integrated circuit (ASIC), a field-programmable gate array (FPGA) or other programmable logic devices, discrete gates or transistor logic devices, and discrete hardware components.

In yet another embodiment provided by the present disclosure, a computer-readable storage medium is provided, in which instructions are stored, which, when run on a computer, cause the computer to execute the video processing method described in any of the above embodiments.

In yet another embodiment provided by the present disclosure, a computer program product containing instructions is provided, which, when run on a computer, causes the computer to execute the video processing method described in any of the above embodiments.

In the above embodiments, the functional units can be implemented in whole or in part by software, hardware, firmware or any combination thereof. When implemented by software, the functional units can be implemented in whole or in part by computer program products. The computer program products include one or more computer instructions. When the computer program instructions are loaded and executed on a computer, the flow or function according to the embodiments of the present disclosure is generated in whole or in part. The computer may be a general purpose computer, a special purpose computer, a computer network, or other programmable devices. The computer instructions may be stored in the computer-readable storage medium or transmitted from one computer-readable storage medium to another. For example, the computer instructions may be transmitted from one website, computer, server or data center to another website, computer, server or data center through wired (such as coaxial cable, optical fiber, digital subscriber line (DSL)) or wireless (such as infrared, wireless, and microwave) methods. The computer readable storage medium may be any available medium that can be accessed by a computer, or a data storage device such as server and data center that contains one or more available media integrations. The available medium may be magnetic medium (e.g., floppy disk, hard disk, magnetic tape), optical medium (e.g., DVD), or semiconductor medium (e.g. solid state disk (SSD)).

Figure 13:
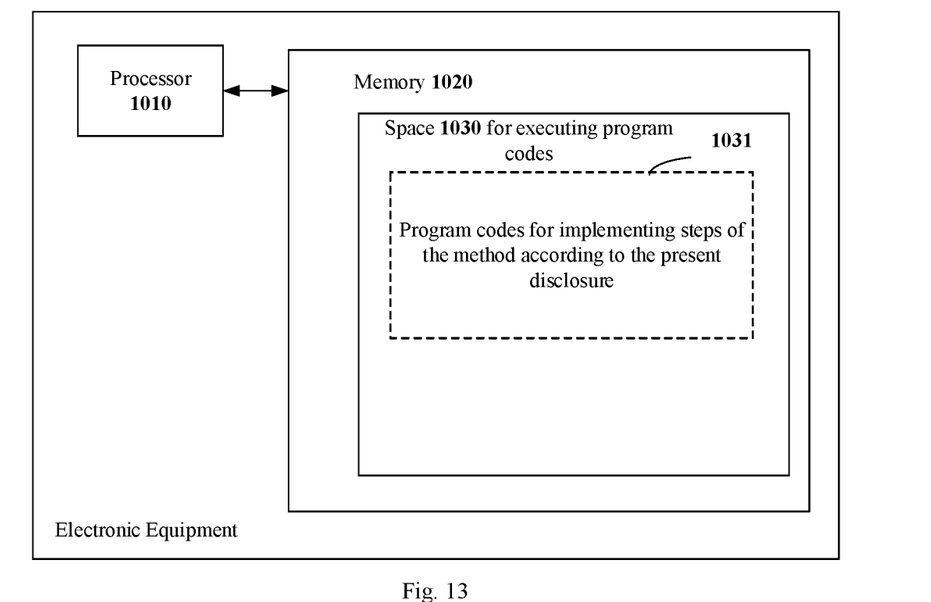
FIG. 13 schematically illustrates a block diagram of electronic equipment for performing the method according to the present disclosure.
Figure 14:
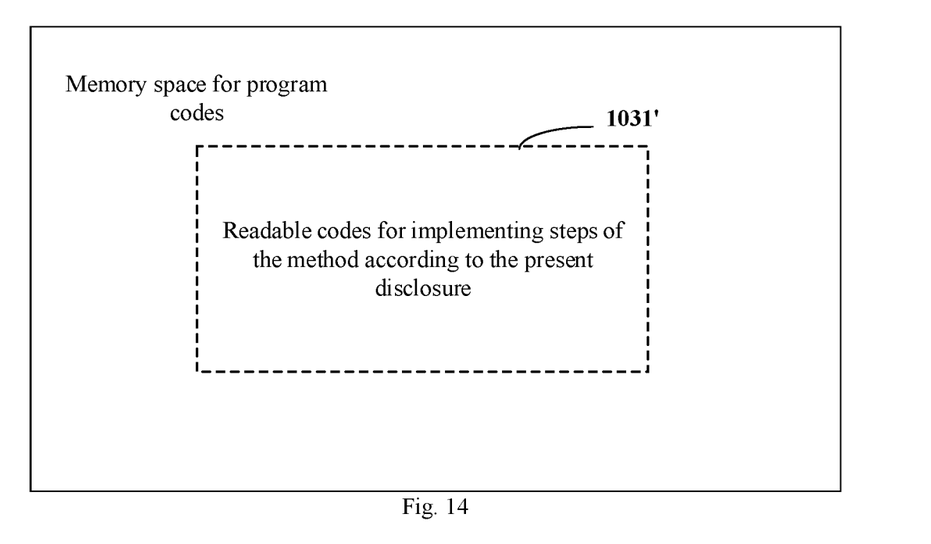
FIG. 14 schematically illustrates a memory cell for maintaining or carrying a program code for implementing the method according to the present disclosure.

For example, FIG. 13 illustrates electronic equipment that may implement the method according to the present disclosure. Traditionally, the electronic equipment includes a processor 1010 and a computer program product or a computer readable medium in form of a memory 1020. The memory 1020 may be electronic memories such as flash memory, EEPROM (Electrically Erasable Programmable Read-Only Memory), EPROM, hard disk or ROM. The memory 1020 has a memory space 1030 for executing program codes 1031 of any steps in the above methods. For example, the memory space 1030 for program codes may comprise respective program codes 1031 for implementing the respective steps in the method as mentioned above. These program codes may be read from and/or be written into one or more computer program products. These computer program products include program code carriers such as hard disk, compact disk (CD), memory card or floppy disk. These computer program products are generally the portable or stable memory cells as shown in reference FIG. 14. The memory cells may be provided with memory sections, memory spaces, etc., similar to the memory 1020 of the electronic equipment as shown in FIG. 13. The program codes may be compressed for example in an appropriate form. Generally, the memory cell includes computer readable codes 1031' which can be read for example by processors 1010. When these codes are operated on the electronic equipment, the electronic equipment is caused to perform respective steps in the method as described above.

It should be noted that herein, relational terms such as first and second are only used to distinguish one entity or operation from another entity or operation, and do not necessarily require or imply any such actual relationship or order between these entities or operations. The terms "comprise", "include" or any other variations thereof, are intended to cover a non-exclusive inclusion, such that a process, method, article, or equipment which includes a list of elements does not include only those elements but also other elements not expressly listed or inherent to such process, method, article, or equipment. Without further limitation, an element defined by the statement "includes a . . . " does not exclude the presence of another identical element in a process, method, article or device that includes the element.

All the embodiments in this specification are described in a relevant manner, and the same and similar parts of different embodiments can serve as references for each other. Each embodiment focuses on its differences from other embodiments. As the system embodiments are basically similar to the method embodiments, the description is relatively simple, and please refer to the description of the method embodiments for relevant information.

The above are only preferred embodiments of this present disclosure, and are not configured to limit the protection scope of this present disclosure. Any modification, equivalent substitution, improvement, etc. made within the spirit and principle of this present disclosure are included in the protection scope of this present disclosure.

The invention claimed is:

1. A video processing method, applied to electronic equipment, comprising: acquiring video data to be processed; generating video enhancement tasks corresponding to each video frame in the video data to be processed, the video enhancement task comprising a plurality of video enhancement subtasks; and executing at least two different video enhancement subtasks of the plurality of video frames in a multi-thread concurrent manner at the same time, a single thread correspondingly executing one type of the video enhancement subtask;
   wherein the video enhancement subtasks comprise a video parsing subtask, an artificial intelligence video enhancement subtask, a traditional video enhancement subtask and a video display subtask; and executing at least two different video enhancement subtasks of the plurality of video frames in a multi-thread concurrent manner at the same time comprises: executing at least four different video enhancement subtasks of the plurality of video frames in the multi-thread concurrent manner at the same time, the video parsing subtask, the artificial intelligence video enhancement subtask, the traditional video enhancement subtask and the video display subtask of each video frame being sequentially executed;
   wherein the electronic equipment comprises a first data processing chip and a second data processing chip; and executing at least four different video enhancement subtasks of the plurality of video frames in the multi-thread concurrent manner at the same time comprises: when executing the artificial intelligence video enhancement subtask, allocating the artificial intelligence video enhancement subtask of at least one video frame to the first data processing chip and the second data processing chip, to run threads of the artificial intelligence video enhancement subtask on the first data processing chip and the second data processing chip;
   wherein allocating the artificial intelligence video enhancement subtask of at least one video frame to the first data processing chip and the second data processing chip comprises: dividing the artificial intelligence video enhancement subtask of the video frame into a plurality of block tasks according to a target block size; and allocating the plurality of block tasks of at least one video frame to the first data processing chip and the second data processing chip.

2. The method according to claim 1, wherein before dividing the artificial intelligence video enhancement subtask of the video frame into a plurality of block tasks according to a target block size, the method further comprises: quantifying data models in the first data processing chip and the second data processing chip by using a size of a single video frame; acquiring a first processing time required for the first data processing chip whose data model is quantized to execute the artificial intelligence video enhancement subtask of the single video frame, and a second processing time required for the second data processing chip whose data model is quantized to execute the artificial intelligence video enhancement subtask of the single video frame; dividing the single video frame according to the ratio of the second processing time to the first processing time to obtain a first sub-video frame and a second sub-video frame; re-quantizing the data model in the first data processing chip by using a size of the first sub-video frame and re-quantizing the data model in the second data processing chip by using a size of the second sub-video frame; acquiring a third processing time and a fourth processing time required for the first data processing chip and the second data processing chip whose data models are re-quantized to execute the artificial intelligence video enhancement subtask of the single video frame; and under the condition that the difference between the third processing time and the fourth processing time is less than a time difference threshold, equally dividing the size of the first sub-video frame according to the number of the first data processing chips, and equally dividing the size of the second sub-video frame according to the number of the second data processing chips to obtain the target block size.

3. The method according to claim 2, wherein after acquiring a third processing time and a fourth processing time required for the first data processing chip and the second data processing chip whose data models are re-quantized to execute the artificial intelligence video enhancement subtask of the single video frame, the method further comprises: under the condition that the difference between the third processing time and the fourth processing time is greater than or equal to the time difference threshold, re-partitioning the single video frame according to the ratio between the product of the size of the first sub-video frame and the third processing time and the product of the size of the first sub-video frame and the fourth processing time, to obtain a third sub-video frame and a fourth sub-video frame; and re-executing the process of acquiring the target block size by using the third sub-video frame and the fourth sub-video frame.

4. The method according to claim 1, wherein the electronic equipment comprises: a mainboard provided with a plurality of compute sticks for running a second thread; and executing at least four different video enhancement subtasks of the plurality of video frames in the multi-thread concurrent manner at the same time comprises: when executing the artificial intelligence video enhancement subtask, training the plurality of compute sticks in turn according to a preset time interval to determine whether there are idle compute sticks; and when there are idle compute sticks, allocating the artificial intelligence video enhancement subtask to the idle compute sticks, to run threads of the artificial intelligence video enhancement subtask on the plurality of compute sticks.

5. The method according to claim 1, wherein, executing at least two different video enhancement subtasks of the plurality of video frames in a multi-thread concurrent manner at the same time comprises: after a previous thread executes a previous video enhancement subtask of a single video frame, changing a synchronization variable of the previous thread from a first synchronization variable to a second synchronization variable according to a variable synchronization rule; and when the synchronization variable of the previous thread is the second synchronization variable, sending an execution result of the previous video enhancement subtask in the previous thread to a next thread, and changing a synchronization variable of the next thread to the second synchronization variable, so that the next thread executes a next video enhancement subtask of the video frame.

6. The method according to claim 1, wherein executing at least two different video enhancement subtasks of the plurality of video frames in a multi-thread concurrent manner at the same time comprises: when executing the artificial intelligence video enhancement subtask, processing pixel values of a first execution result according to a normalization rule to obtain normalized data; inputting the normalized data into a video enhancement model to obtain video enhancement data; and processing pixel values of the video enhancement data according to an anti-normalization rule.

7. The method according to claim 1, wherein executing at least two different video enhancement subtasks of the plurality of video frames in a multi-thread concurrent manner at the same time comprises: when executing a traditional video enhancement subtask, performing video enhancement on a second processing result in at least one of the following ways: smoothness enhancement, authenticity enhancement, detail enhancement, contrast and brightness enhancement and size adjustment.

8. Electronic equipment, comprising a memory, a processor, and a computer program stored in the memory and operable on the processor, wherein when the processor executes the computer program, implementing the operations comprising: acquiring video data to be processed; generating video enhancement tasks corresponding to each video frame in the video data to be processed, the video enhancement task comprising a plurality of video enhancement subtasks; and executing at least two different video enhancement subtasks of the plurality of video frames in a multi-thread concurrent manner at the same time, a single thread correspondingly executing one type of the video enhancement subtask;

wherein the video enhancement subtasks comprise a video parsing subtask, an artificial intelligence video enhancement subtask, a traditional video enhancement subtask and a video display subtask; and executing at least two different video enhancement subtasks of the plurality of video frames in a multi-thread concurrent manner at the same time comprises: executing at least four different video enhancement subtasks of the plurality of video frames in the multi-thread concurrent manner at the same time, the video parsing subtask, the artificial intelligence video enhancement subtask, the traditional video enhancement subtask and the video display subtask of each video frame being sequentially executed;

wherein the electronic equipment comprises a first data processing chip and a second data processing chip; and executing at least four different video enhancement subtasks of the plurality of video frames in the multi-thread concurrent manner at the same time comprises: when executing the artificial intelligence video enhancement subtask, allocating the artificial intelligence video enhancement subtask of at least one video frame to the first data processing chip and the second data processing chip, to run threads of the artificial intelligence video enhancement subtask on the first data processing chip and the second data processing chip;

wherein allocating the artificial intelligence video enhancement subtask of at least one video frame to the first data processing chip and the second data processing chip comprises: dividing the artificial intelligence video enhancement subtask of the video frame into a plurality of block tasks according to a target block size; and allocating the plurality of block tasks of at least one video frame to the first data processing chip and the second data processing chip.

9. The electronic equipment according to claim 8, wherein the electronic equipment comprises: a mainboard provided with a plurality of compute sticks for running a second thread; and executing at least four different video enhancement subtasks of the plurality of video frames in the multi-thread concurrent manner at the same time comprises: when executing the artificial intelligence video enhancement subtask, training the plurality of compute sticks in turn according to a preset time interval to determine whether there are idle compute sticks; and when there are idle compute sticks, allocating the artificial intelligence video enhancement subtask to the idle compute sticks, to run threads of the artificial intelligence video enhancement subtask on the plurality of compute sticks.

10. A non-transitory computer readable storage medium, wherein the computer readable storage medium stores a computer program which, when executed by a processor, implements the operations comprising: acquiring video data to be processed; generating video enhancement tasks corresponding to each video frame in the video data to be processed, the video enhancement task comprising a plurality of video enhancement subtasks; and executing at least two different video enhancement subtasks of the plurality of video frames in a multi-thread concurrent manner at the same time, a single thread correspondingly executing one type of the video enhancement subtask;

wherein the video enhancement subtasks comprise a video parsing subtask, an artificial intelligence video enhancement subtask, a traditional video enhancement subtask and a video display subtask; and executing at least two different video enhancement subtasks of the plurality of video frames in a multi-thread concurrent manner at the same time comprises: executing at least four different video enhancement subtasks of the plurality of video frames in the multi-thread concurrent manner at the same time, the video parsing subtask, the artificial intelligence video enhancement subtask, the traditional video enhancement subtask and the video display subtask of each video frame being sequentially executed;

wherein the electronic equipment comprises a first data processing chip and a second data processing chip; and executing at least four different video enhancement subtasks of the plurality of video frames in the multi-thread concurrent manner at the same time comprises: when executing the artificial intelligence video enhancement subtask, allocating the artificial intelligence video enhancement subtask of at least one video frame to the first data processing chip and the second data processing chip, to run threads of the artificial intelligence video enhancement subtask on the first data processing chip and the second data processing chip;
wherein allocating the artificial intelligence video enhancement subtask of at least one video frame to the first data processing chip and the second data processing chip comprises: dividing the artificial intelligence video enhancement subtask of the video frame into a plurality of block tasks according to a target block size; and allocating the plurality of block tasks of at least one video frame to the first data processing chip and the second data processing chip.

11. A computer program product, comprising a non-transitory computer readable, wherein when the computer-readable code runs on electronic equipment, the electronic equipment is caused to perform the video processing method comprising: acquiring video data to be processed; generating video enhancement tasks corresponding to each video frame in the video data to be processed, the video enhancement task comprising a plurality of video enhancement subtasks; and executing at least two different video enhancement subtasks of the plurality of video frames in a multi-thread concurrent manner at the same time, a single thread correspondingly executing one type of the video enhancement subtask;
wherein the video enhancement subtasks comprise a video parsing subtask, an artificial intelligence video enhancement subtask, a traditional video enhancement subtask and a video display subtask; and executing at least two different video enhancement subtasks of the plurality of video frames in a multi-thread concurrent manner at the same time comprises: executing at least four different video enhancement subtasks of the plurality of video frames in the multi-thread concurrent manner at the same time, the video parsing subtask, the artificial intelligence video enhancement subtask, the traditional video enhancement subtask and the video display subtask of each video frame being sequentially executed;
wherein the electronic equipment comprises a first data processing chip and a second data processing chip; and executing at least four different video enhancement subtasks of the plurality of video frames in the multi-thread concurrent manner at the same time comprises: when executing the artificial intelligence video enhancement subtask, allocating the artificial intelligence video enhancement subtask of at least one video frame to the first data processing chip and the second data processing chip, to run threads of the artificial intelligence video enhancement subtask on the first data processing chip and the second data processing chip;
wherein allocating the artificial intelligence video enhancement subtask of at least one video frame to the first data processing chip and the second data processing chip comprises: dividing the artificial intelligence video enhancement subtask of the video frame into a plurality of block tasks according to a target block size; and allocating the plurality of block tasks of at least one video frame to the first data processing chip and the second data processing chip.

* * * * *